Figure 1:
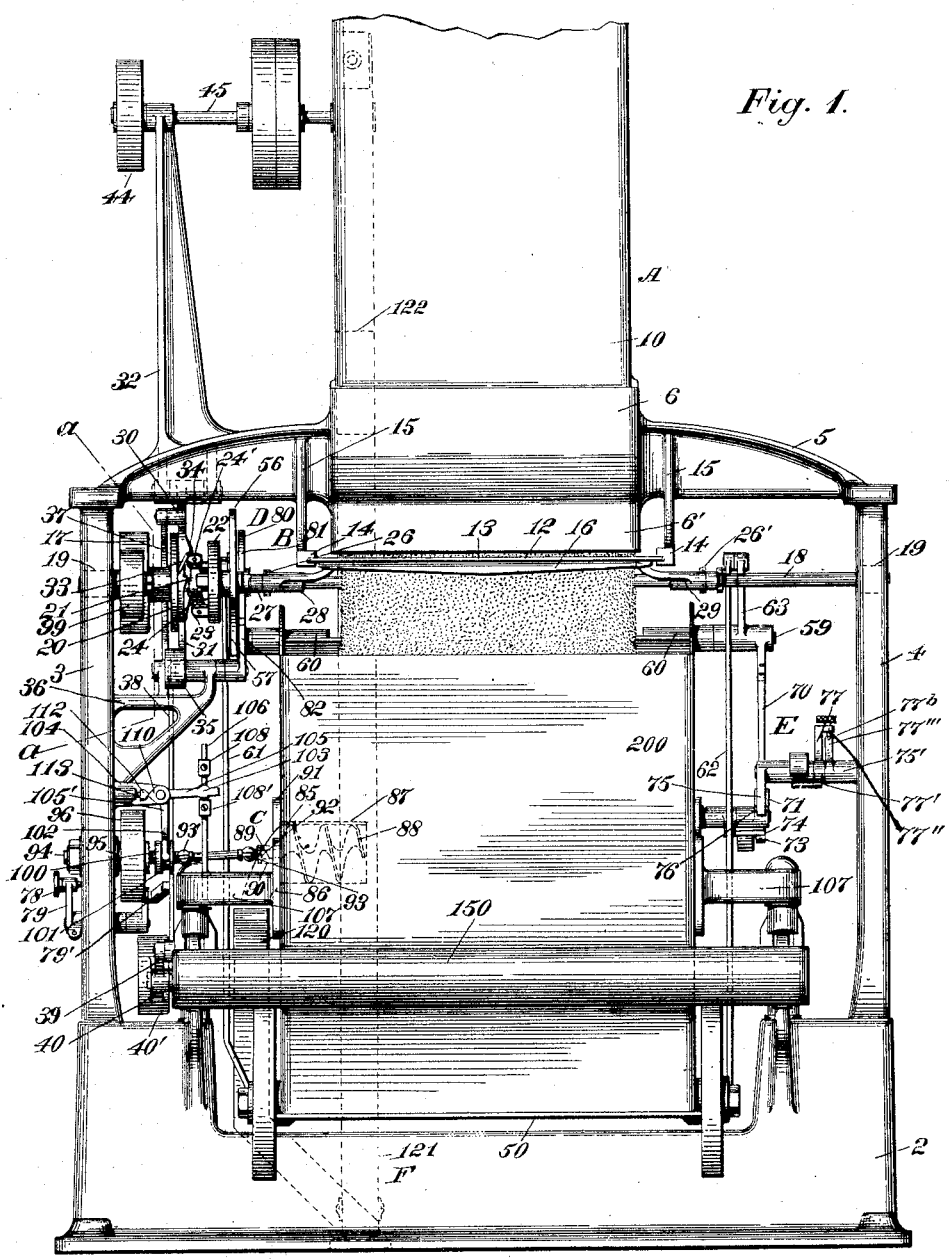

No. 618,383. Patented Jan. 24, 1899.
F. H. RICHARDS.
WEIGHING MACHINE.
(Application filed Jan. 28, 1897.)
(No Model.) 7 Sheets—Sheet 1.

Witnesses
Chas. P. Schuck
R. W. Pittman

Inventor
F. H. Richards

No. 618,383. Patented Jan. 24, 1899.
F. H. RICHARDS.
WEIGHING MACHINE.
(Application filed Jan. 28, 1897.)
(No Model.) 7 Sheets—Sheet 2.

Witnesses
Chas. F. Schnell
R. W. Pittman

Inventor
F. H. Richards

No. 618,383. Patented Jan. 24, 1899.
F. H. RICHARDS.
WEIGHING MACHINE.
(Application filed Jan. 28, 1897.)
(No Model.) 7 Sheets—Sheet 3.

Witnesses
Inventor

No. 618,383. Patented Jan. 24, 1899.
F. H. RICHARDS.
WEIGHING MACHINE.
(Application filed Jan. 28, 1897.)
(No Model.) 7 Sheets—Sheet 4.

Witnesses
Chas. L. Schmelz
R. W. Pittman

Inventor
F H Richards

No. 618,383. Patented Jan. 24, 1899.
F. H. RICHARDS.
WEIGHING MACHINE.
(Application filed Jan. 28, 1897.)
(No Model.) 7 Sheets—Sheet 5.

Witnesses
Chas. F. Schmelz
R. W. Pittman

Inventor
F. H. Richards

No. 618,383. Patented Jan. 24, 1899.
F. H. RICHARDS.
WEIGHING MACHINE.
(Application filed Jan. 28, 1897.)
(No Model.) 7 Sheets—Sheet 6.

Witnesses:
R. W. Pittman
C. H. Reed

Inventor:
F. H. Richards

No. 618,383. Patented Jan. 24, 1899.
F. H. RICHARDS.
WEIGHING MACHINE.
(Application filed Jan. 28, 1897.)
(No Model.) 7 Sheets—Sheet 7.
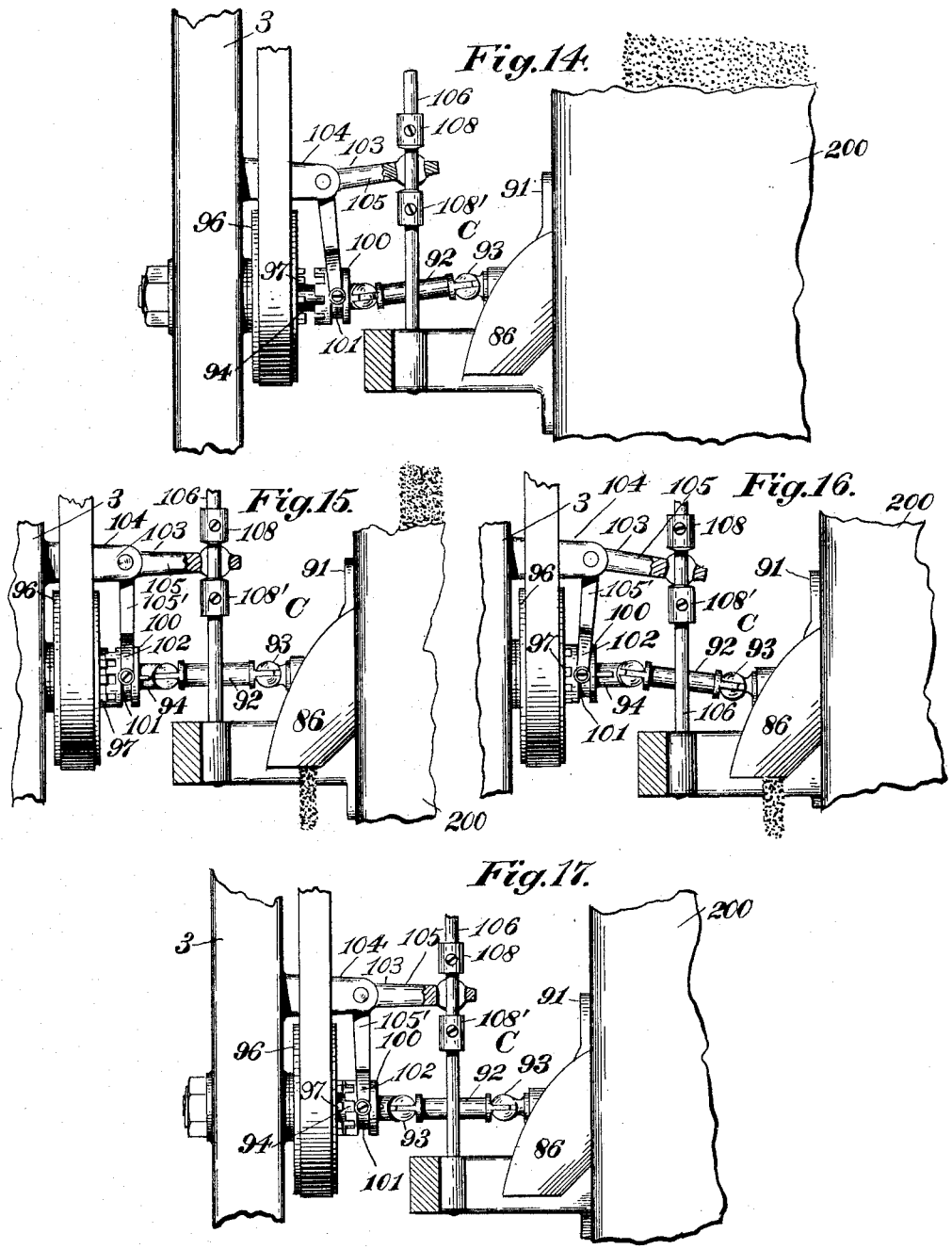
Witnesses:
Inventor:
F. H. Richards

United States Patent Office.

FRANCIS H. RICHARDS, OF HARTFORD, CONNECTICUT.

WEIGHING-MACHINE.

SPECIFICATION forming part of Letters Patent No. 618,383, dated January 24, 1899.

Application filed January 28, 1897. Serial No. 621,044. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, more particularly to that class designated as "rising-poise" weighing-machines, the object thereof being to provide apparatus of this character operative to accurately and quickly weigh the material supplied to the load receiver or receptacle by reducing the amount or overload thereof before the final discharge or disposition of the major part of such material rather than by gradually increasing intermittently or continuously an underload, as has been the general practice heretofore, and to secure such reduction either by an instrumentality, means, or mechanism which during the load-reducing period may be mechanically continuously operative to permit or cause the reduction of such load or by an instrumentality, means, or mechanism operative positively to reduce or effect the reduction of such load and which latter character of load-reducing means is operative positively to effect this result, as contradistinguished from means simply operative to permit this reduction to take place—as, for instance, by the inherent action of the material itself, due to gravity.

A further object of the invention is to provide an improved organization of mechanisms, thereby forming an improved weighing machine or apparatus.

Heretofore in order to obtain a proper load in weighing-machines it has been the usual practice after the major part of the load has been supplied to the receiver to gradually increase, either intermittently or continuously, such underload by a stream, usually termed a "drip-stream," until a true load is made up; but in those classes of machines constructed to weigh a large amount of material at one operation this has been to a certain extent found impracticable, as owing to the impact of even a comparatively small drip-stream in conjunction with the momentum of the poising mechanism the overpoising of such mechanism takes place before a true and correct load is made up, and hence like the invention set forth in Patent No. 572,067, dated November 24, 1896, to obviate this difficulty an overload is preferably supplied to the load receiver or receptacle, and during the weighing operation this overload is reduced by means or mechanism herein termed "load-reducing" means, instrumentality, or mechanism until the correct load is obtained, when the same can be disposed of or discharged in the usual or any desired manner; and therefore within the scope of this invention is considered any means, apparatus, mechanism, or machine in which the correct and true load is obtained by reducing, before the final discharge or disposition of the major part of such load, an overload or any amount of material previously supplied to the load receiver or receptacle by any instrumentality, means, or mechanism operative to convey, feed, or discharge therefrom, or cause the load to decrease in any manner other than by the direct removal therefrom manually through the instrumentality of a scoop or like device and as contradistinguished from means for simply permitting a decrease or reduction of such load—as, for instance, by its own inherent action—as set forth in my prior patent, No. 572,067, dated November 24, 1896.

Also within the scope of this invention is considered any device, instrumentality, or means which during the load-reducing period may be mechanically continuously operative to permit a reduction of or cause the load in the receptacle to be decreased or reduced, as contradistinguished from means having an intermittent action during such load-reducing period—as, for instance, means or a valve having an opening-and-closing movement, intermediate of which action it has no movement whatever during such load-reducing period, as in my patent above referred to. It will be understood, however, that while the reduction of the load may take place after the material has been completely supplied to the load-receiver, yet such reduction may also take place simultaneously with or during a part of such supply thereto, if desired, and hence this invention is not limited to the reduction of the material only after the supply is completely made, as such reduction may take place during such supply, and therefore any device, means, or mechanism operative to reduce or weigh and reduce or permit to be reduced or decreased the material or load during the supply to the weighing mechanism is likewise considered within the scope of this invention, the gist of which is to reduce the load before its final disposition or discharge from the weighing mechanism, thereby to obtain a correct and true load.

I desire to state that the reduction need not necessarily be less than the supply, as shown in the drawings, (see Fig. 1,) since it may be found preferable in other constructions to have the reduction or outflow somewhat greater than the inflow or supply.

In the drawings accompanying and forming part of this specification this invention is shown in one form of weighing apparatus, in which—

Figure 2:
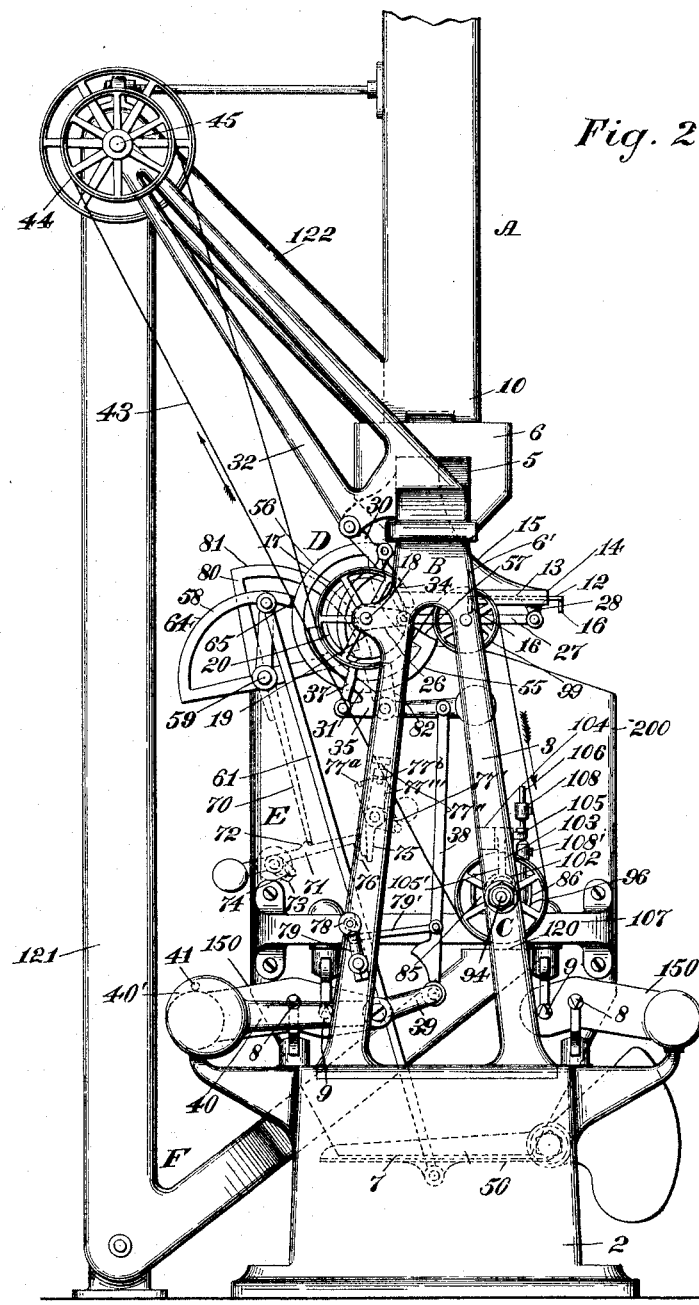
Figure 3:
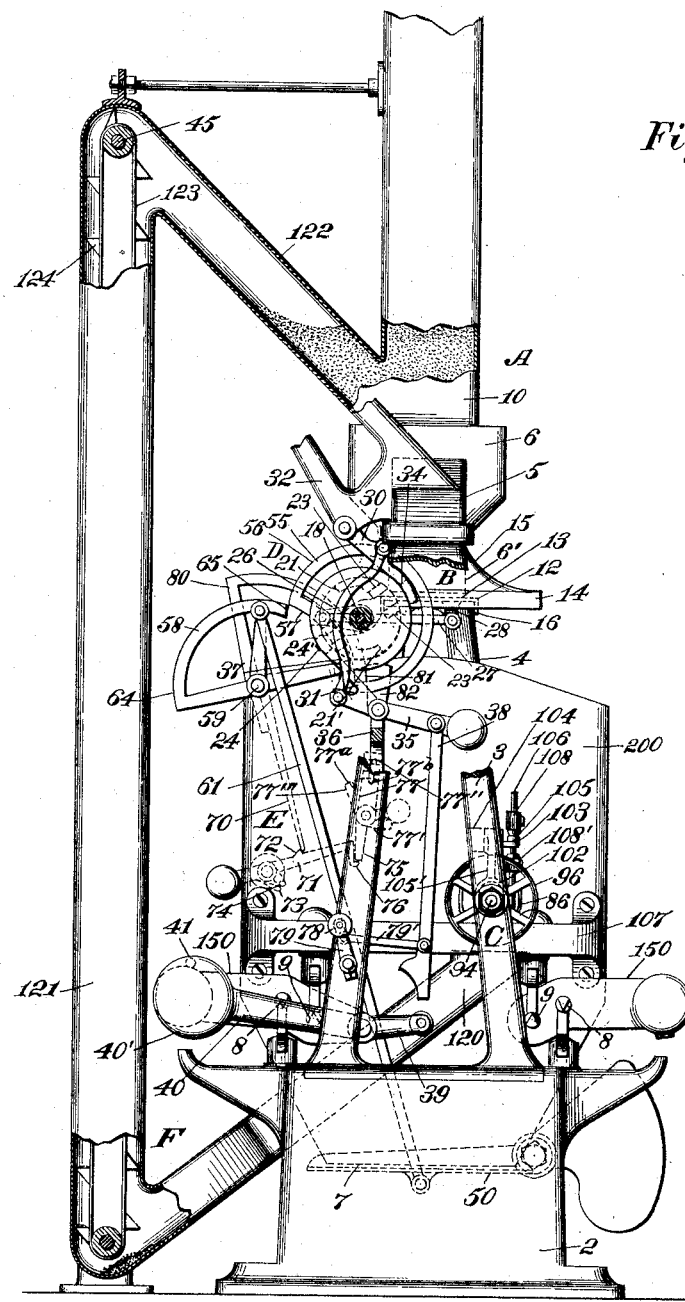
Figure 4:
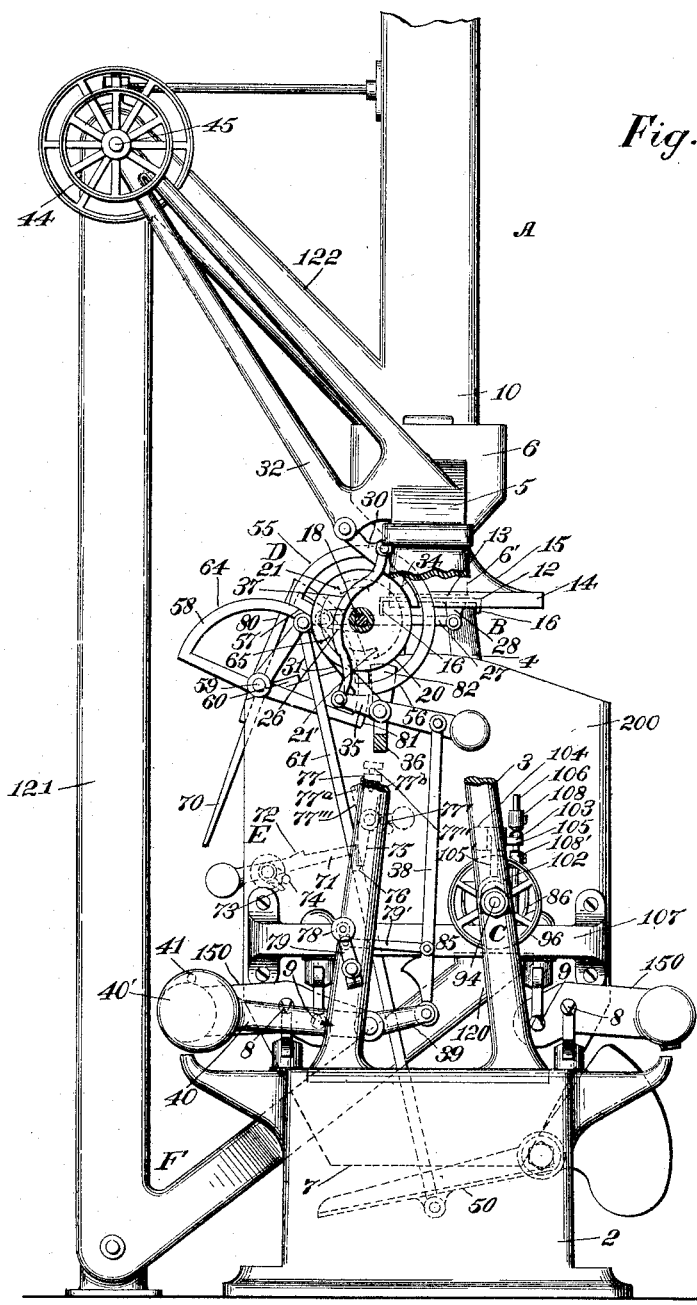
Figure 6:
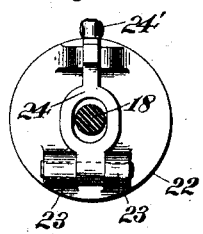
Figure 7:
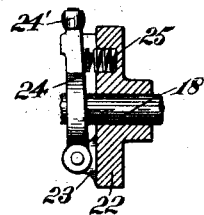
Figure 5:
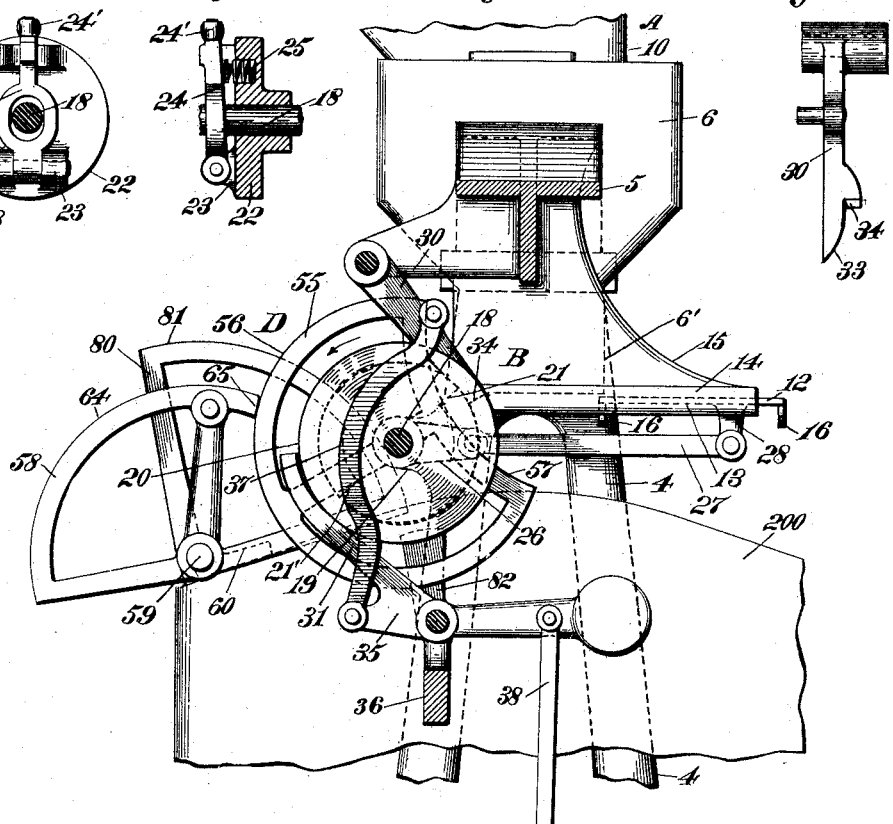
Figure 8:
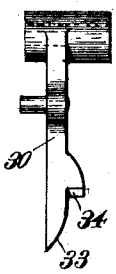
Figure 9:
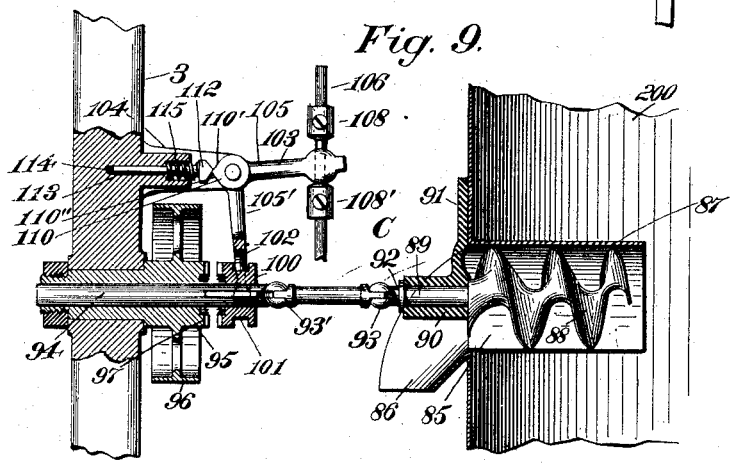
Figure 10:
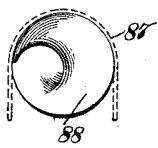
Figure 12:
Figure 11:
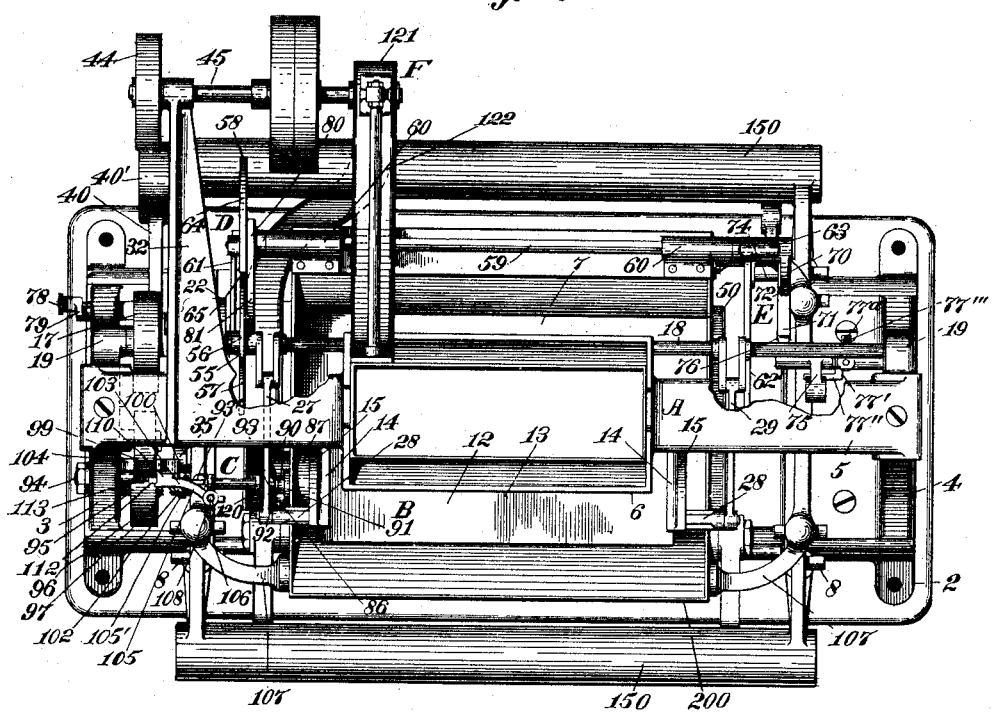
Figure 13:
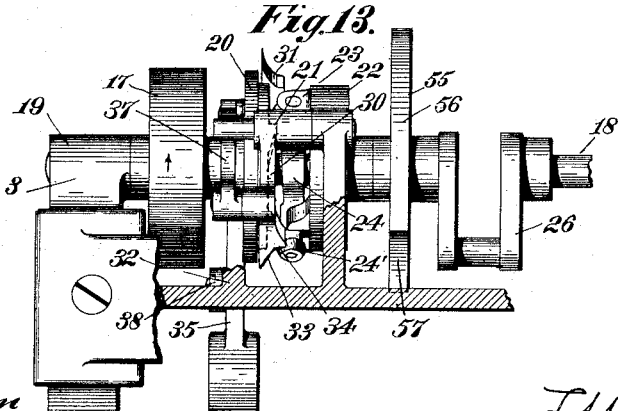

Figure 1 is a front view of a weighing-machine constructed in accordance with the invention. Fig. 2 is a left-hand side elevation thereof, with parts shown in dotted lines. Figs. 3 and 4 are likewise left-hand side elevations with parts thereof in dotted lines and broken away to illustrate more clearly the operation of the apparatus, said Figs. 2, 3, and 4 illustrating the weighing-machine in its different operative positions. Fig. 5 is a sectional view of the upper portion of the machine and taken in line $a\ a$, Fig. 1, and looking toward the left-hand thereof. Figs. 6 and 7 are detail side and sectional views, respectively, of the driven member of a clutch mechanism shown herein forming a part of the valve actuating or driving means. Fig. 8 is a detail view of one of the members or interrupters for throwing the valve-clutch out of operation. Fig. 9 is a partly-sectional view of one form of reducing means or mechanism used herein. Fig. 10 is an end view of a feeder, conveyer, or discharger and a hood surrounding the same, the latter being in dotted lines. Fig. 11 is a plan view of this form of weighing-machine, with parts thereof broken away to illustrate more clearly the operative mechanisms. Fig. 12 is a detail view of the crank-shaft and clutch mechanism constituting a part of the valve actuating or driving means. Fig. 13 is an enlarged partly-sectional view showing the disposition relatively to the machine and construction of the clutch mechanism forming a part of said valve driving or actuating means. Fig. 14 is a side elevation of mechanism substantially similar to that shown in Fig. 9 and illustrates the adjustable sleeve 108 so adjusted that it is in comparatively close relationship to the clutch-actuator 103, thereby to throw the load-reducing means into operation simultaneously with and during a part of the supply of material to the weighing mechanism. Fig. 15 illustrates the load-reducing means in operation, whereby the reduction of the load is effected simultaneously with a part of the supply and during the descent of the load-receiver and shown herein as that period when the load-receiver would ordinarily approximately reach a poise position in its descent and before any appreciable amount of the overload may have been supplied. Fig. 16 illustrates the load-reducing means in operation after the supply is cut off and when the load-receiver is in its overload position; and Fig. 17 illustrates the poising of the load-receiver with its true load, the load reduction having been cut off.

Similar characters designate like parts in all the figures of the drawings.

This improved weighing-machine comprehends load or overload supply means for the load-receiver, load-reducing means for positively decreasing or reducing a part of such load before the final discharge of the major part of the load, and load-discharging means operative to discharge the completed or true load combined and operative to constitute an improved rising-poise weighing-machine, illustrated herein involving, among other improvements and in its preferred form herein shown and described, improved valve mechanism comprising in a general way a reciprocatory or sliding valve, driving means for actuating the same, and means for regulating the operation of this driving or actuating means, and thereby the movement of the valve, rotary load-reducing means or mechanism operative to reduce at a certain predetermined period and before the true load is obtained the material in or previously supplied to the receiver or receptacle, as contradistinguished from means for simply permitting a reduction of such load and improved locking means for the valve and closer mechanisms.

As a preface to a further description of this improved weighing-machine it will be understood that the various mechanisms shown herein could be more or less modified. For instance, other closer, beam, and valve mechanisms similar to those heretofore patented by me and to which more particular reference is not herein deemed necessary may be adapted for use in connection with the reducing means or mechanism covered and set forth by this specification without departing from the gist and scope of this invention, which more particularly comprehends the reducing means or mechanisms covered herein in connection with any valve, closer, or other coöperative mechanism, and hence while a part of the mechanism shown combined herein to produce an operative weighing-machine are in themselves improvements upon mechanisms of similar character heretofore patented by me they may nevertheless be replaced by such heretofore-patented or other devices and the same results accomplished in conjunction with the reducing mechanism set forth. It will, moreover, be understood that the load-reducing means may be timed or constructed to commence its operation only after the load receiver or receptacle has made a complete descent, but is still weighing the load, in order to discharge a portion of such load, and thus permit said receiver to reascend to its poising-point to obtain a complete and true load instead, as herein set forth for the purposes of this specification, of commencing such partial discharge during the descent of said receiver.

This improved weighing-machine comprises in a general way a load receiver or receptacle provided with a shiftable member or closer (herein shown forming the main load-discharging means) and beam mechanism for supporting such load receiver or receptacle, and which parts form the weighing or poising mechanism properly considered and may be of any suitable and desired construction adapted for the purpose and similar, if desired, to any of those heretofore patented by me in my prior patents and to which more particular reference is not herein deemed necessary; means (designated in a general way by A) for supplying material to be weighed to said load receiver or receptacle; stream-controlling or valve mechanism (designated in a general way by B) for regulating such supply to the load-receiver and embodying or having driving means therefor; a load-reducing instrumentality, means, or mechanism (designated in a general way by C) operative for reducing during the weighing operation or before the final disposition or discharge of a load the amount or overload of material supplied to or in said load-receiver to permit a correct and true load to be obtained and embodying or having driving means therefor; means (designated in a general way by D) for locking the closer shut when the valve is open and for locking the valve shut when the closer is open, and which locking means also comprehends supplemental locking means (designated in a general way by E) for maintaining the closer shut at a predetermined period in the operation of the machine when the primary or main locking means is inoperative for this purpose, and which supplemental locking means is shown herein operative on the ascent of the load-receptacle during the weighing of its load to unlock such closer, and means (designated in a general way by F) for conveying the surplus or excess material into position to constitute a part of a new supply to the load-receptacle.

Any suitable and desired framework may be used for supporting the operative parts of this improved weighing-machine; but it is herein shown embodying a base 2, carrying a pair of uprights or side frames 3 and 4, united at the tops thereof by a top plate 5, and which top plate is shown supporting the material-supply means, such as a supply-hopper 6, having a chute 6' of ordinary construction, if desired. The material or load receiver or receptacle (designated in a general way by 200) may also be of any desired form and construction; but it is herein illustrated as a bucket, preferably of the "single-chambered" type or class, and provided with a main discharge opening or outlet 7, closable by suitable shiftable or closer mechanism hereinafter described.

The beam mechanism (designated in a general way by 150) for supporting or carrying the load-receptacle 200 may likewise be of any suitable and desired construction, and it is herein illustrated supported by suitable bearings carried by the base 2 and also provided with suitable bearings for supporting the receptacle. In the construction shown this beam mechanism is preferably substantially similar to that shown and described in my Patent No. 572,071, dated November 24, 1896, and is therefore shown supported by knife-edges 8 upon the base 2 in a well-known manner, while the load-receptacle is likewise supported by similar knife-edges 9, carried by the beam mechanism, and which beam mechanism is shown weighted for counterbalancing such receptacle and its load.

The load-receptacle is supplied with material to form its load by a chute 6', connected with a hopper 6, as above set forth, and which hopper may be connected in any desired way with a suitable source of supply, but is shown provided with a conduit 10 for conducting the material from its source of supply to the hopper and chute, through which it is fed to the bucket. It will be obvious that any other desired load supply or feeding means may be used in place of that shown, if preferred. To regulate this supply of material to the bucket, suitable stream-controlling means, such as valve mechanism, (designated generally by B,) is provided and which valve mechanism comprehends in its preferred form herein shown a reciprocatory or sliding valve 12, operable alternately to permit the passage or flow of material from the supply-chute to the bucket and to cut off the same at a predetermined time in the operation of the mechanism, driving means for actuating said valve, and means for regulating the operation of or interrupting this driving means, and in this particular structure the valve is illustrated as a plate 13, supported for sliding movement in a pair of slideways 14, formed at the lower ends of a pair of downwardly-extending brackets or arms 15, one secured at each side of the supply-chute 6', and which valve-plate may be provided, if desired, with ribs or supports, as 16, for stiffening the same against the weight of the material resting thereon when said valve is closed. The means for actuating this valve preferably comprises, as before stated herein, driving means operated from a suitable source of power to alternately open and close the supply-chute, and in its preferred form shown it comprehends rotary means, such as a continuously-rotating wheel or pulley 17, operatively connected with any suitable source of power, and which wheel is shown loosely mounted on a three-part crank-shaft 18, supported for intermittent rotation in a suitable bearing 19 of each side frame. Shown rigid with the hub of this wheel or pulley 17 for continuous rotation therewith is one, as the driving member 20, of one form of clutch mechanism, which is provided herein with a plurality of notches or projections (shown as two in number) 21 and 21', diametrically disposed relatively to each other for the purpose hereinafter specified. Fixedly secured on this shaft 18 is the other, as the driven member of this clutch mechanism, and which is shown comprising a disk 22, provided with a pair of ears or lugs 23 for the reception of a shiftable member or clutch-arm 24, pivotally secured to said disk and provided at its free end with a bearing, such as a roll 24'. Intermediate this clutch-arm and its carrying-disk is a coiled spring 25 for normally forcing said arm outwardly to maintain the same in engagement with one or the other of the notches 21 or 21' of the driving clutch member 20, whereby the two members of the clutch will be operatively connected together for simultaneous rotation. The shaft 18 is provided with two sets of crank-arms 26 and 26', respectively. To the crank-arms 26 is pivotally secured one end of a connector 27, in the nature of a connecting rod or lever, the opposite end of said lever being pivotally connected to an arm 28, projecting from the valve-plate 13, whereby on the rotation of the shaft through the medium of the clutch mechanism the valve will be reciprocated to regulate the supply of material to the bucket. The opposite side of this valve-plate 13 is similarly connected with the other crank-arms 26' of said shaft 18 by a similar connector 29.

To permit the supply of material to the bucket to be a continuous one for a predetermined period and to also cut off such supply for a predetermined period in the operation of the machine, it is desirable that the clutch members be disengaged or disconnected from each other at a certain period in the operation of said machine, and for this purpose suitable means for regulating or interrupting the operation of this clutch mechanism, and thereby the reciprocation of the valve, is provided, and which in the preferred form shown comprises shiftable clutch regulator or interrupter mechanism controlled or operative by the weighing mechanism, preferably through the medium of the beam mechanism, and which shiftable mechanism is shown comprehending a pair of swinging members or arms 30 and 31, one, as 30, pivotally secured to a part of the framework, shown as a bracket 32, constituting a support for a part of the driving means, hereinafter more particularly referred to, and whereby said member 30 is in position to oscillate intermediate the clutch members. This member 30 is provided with a cam-face 33, terminating in a stop 34. The other shiftable member 31, which is similarly formed, is disposed below and extends in an opposite direction to the member 30 and is shown on the hub of and therefore movable with a clutch-regulator 35, pivotally secured to a bracket 36, projecting from one of the side frames, as 3. This clutch-regulator 35, which thus constitutes a part of the clutch-regulating means, is shown as a weighted lever having pivotally secured thereto adjacent to its non-weighted end a suitable connector 37, the opposite end of which is pivotally secured to the shiftable member or arm 30, whereby on the actuation of this clutch-regulator 35 the arms 30 and 31 will be operated simultaneously, one to swing intermediate the clutch members and the other away therefrom. To operate this weighted clutch-regulator 35, it is shown provided with an actuating member 38, such as an actuator or thrust-rod, pivotally secured thereto, the lower end of which is in position to be engaged by an arm 39, projecting from a counterweighted member or lever 40, (shown herein pivotally secured to the inner end of and forming a part of the beam mechanism,) the weight 40' thereof being provided with a stop or stop-pin 41, adapted to engage a face of one of the weights of the beam mechanism, whereby the downward movement of such lever 40 is limited and whereby also such lever is movable in one direction simultaneously with the beam mechanism and operates in the manner hereinafter set forth to operate the actuating-rod 38, and thereby the shiftable arms 30 and 31 to permit the engagement and disengagement of the clutch members. From the foregoing it will be obvious that when the shiftable arm 30 is thrown outward it thus releases the spring-pressed clutch-arm 24 of the clutch member 22 and permits the same to move into engagement with one of the notches of the clutch member 20, whereby the shaft will be rotated with the pulley 17, such rotation being limited, however, by the other shiftable arm 31, which was drawn intermediate the clutch members, as the arm 30 was thrown outward therefrom, and thus disengages said clutch members when they have made a half-rotation, at which time the clutch-arm 24 comes into engagement with the cam-face 33 of said arm 31 and is thus disengaged from the notch of the clutch member 20, the further rotation of such clutch member 22 being limited by the stop 34, whereupon further movement of the valve ceases.

For continuously rotating the pulley 17 the same is shown connected by a suitable belt 43, Fig. 2, with a pulley 44, fixedly secured to a shaft 45, (shown mounted in bearings carried by the bracket 32, and surplus-conduit.) This shaft 45 also carries a fast and loose pulley, one operatively connected by a shiftable belt (not shown) with any suitable source of power, such as a motor. It will of course be understood that these pulleys and their shaft may be supported not only in any other desired manner, but also in any other desired position.

The load receptacle or bucket in this form of machine is provided with suitable load-discharging means, such as a closer mechanism, illustrated as a closer 50, secured to the bucket adjacent to its main discharge opening or outlet 7 for shiftable movement, and counterweighted, whereby said closer is operable to quickly shut after the discharge of the material from the bucket, but is insufficient in itself to remain shut against the weight of a load in said bucket. Therefore to maintain this closer shut while the valve is open and while the bucket is being loaded and until the true and correct load is obtained and to also maintain the valve closed when the closer is open suitable locking mechanism is provided and herein designated, for the purposes of this specification, as "valve-closer locking means" and which in the preferred form thereof herein shown and described embodies interlocking means, one part of which comprises rotary locking means, shown comprehending a stop member 55, fixedly secured to the crank-shaft, whereby it is rotatable with the hub of the driven member 22 of the clutch and which stop member 55 is provided with a curved or convex working face 56 and with a curved or concaved stop-face 57, each coöperating at predetermined periods with a shiftable member in the nature of a rocking stop 58, shiftably carried in the present instance on the bucket by means of a rock-shaft 59, supported in bearings 60 of said bucket, and which rocking stop 58 is operatively connected with the closer by a connector 61, (shown as a connecting member or rod,) said closer being also connected at its opposite end by a similar connector 62 with an arm 63, fixedly secured to said rock-shaft 59 at the opposite side of the bucket. This shiftable stop is likewise provided with a curved or convex working face 64 and with a stop-face 65, each coöperating at the proper time with the faces of the rotary stop, whereby when the convex face 56 of the rotary stop 55 is in engagement with the plane stop-face 65 of the rocking stop 59 the closer is locked shut, and when the convex face 64 of the rocking stop 59 is in engagement with the concaved face 57 of the rotary stop 55 the valve is in turn locked closed, whereby these locking members thus constitute an interlock to positively lock the valve closed when the closer is open and to positively lock the closer shut when the valve is open. In order, however, to maintain the closer shut after the valve cuts off the supply of material to the bucket, and which action of the valve in cutting off the supply in the present machine unlocks the closer, and until the true load has been obtained, suitable supplemental locking means is provided which is operative to maintain the closer locked shut, while the overload is being reduced to obtain the proper and true load, and which supplemental locking means comprehends a shiftable member in the nature of a downwardly-extending lever 70, secured to and shiftable with the rocking stop 58, carried by the bucket, the free end of which lever 70 is locked against movement at certain periods in the operation of the weighing-machine by a locker 71, (shown herein as a pivotally-disposed locking-latch,) carried by the bucket and weighted at one end thereof and provided with a catch 72 for engaging said shiftable member 70. This locker has a stop-arm 73, adapted to engage a stop-pin 74 to thereby limit the upward movement of said locker. One means shown for actuating this locker 71 at the proper time, and shown herein as occurring during the ascent of the bucket with its load and before the discharge thereof, comprises a shiftable trip member or arm 75, weighted and pivotally secured to a hub 75', projecting from one of the side frames, as 4, and in position to engage a hook or catch 76, carried by the free end of the locker 71, whereby on the upward movement of said bucket this trip-arm 75 will depress the locker 71 until the lever 70 is released therefrom, whereby the closer can open by the weight of the bucket-load to discharge such load. This trip-arm 75 is shown provided with means for actuating the same manually to thereby throw and hold or lock the same out of engagement with the locker, and thus prevent the opening of the closer when it is desired to test the operation of the weighing mechanism to ascertain if the same is poising correctly, and for this purpose a pivotally-disposed angle-lever 77 is shown mounted on said hub 75' and provided with a lug 77' in position beneath the weighted end of said trip-arm 75 and with a stop device or pin 77", carried by and shiftable with said angle-lever relatively to a pair of notches or recesses 77$^a$ and 77$^b$, carried by a fixed bracket 77''', whereby on the shifting of said stop device into the notch 77$^a$ the trip-arm will be maintained or locked in its non-tripping position and out of engagement with said locker 71, and when the stop device is shifted into the notch 77$^b$ (see Figs. 2, 3, and 4) said trip-arm will be limited by the lug 77' against movement in the opposite direction, whereby such angle-lever 77 thus constitutes a combined trip-arm limiter, actuator, and locker. This trip-arm 75 can be thrown out of position by the operator at any time during the loading of the bucket without affecting the operation of the machine, after which and when the valve is shut off the actuating member or rod 38 can be likewise thrown out of position in the usual manner by means of its operating device 78 and connecting members or levers 79 and 79', preferably of ordinary construction.

Since in this construction of weighing apparatus the actuator 38 for regulating the operation of the clutch members is shown operated by that part of the weighing mechanism comprehending the beam mechanism through the instrumentality of the counterweighted lever 40, hereinbefore described and in a manner hereinafter set forth, it is desirable that such actuator be locked against movement when said counterweighted lever 40 descends with the beam mechanism on the ascent of the bucket from its poising-point to its normal position and until after the complete discharge of the bucket-load and also that such lever 40 be held in position to have a descending movement independently of the descending movement of the beam mechanism in order to operate such actuator 38 at the proper time to thereby open the valve, and for this purpose locking mechanism is provided operable to lock the actuator 38 and the shiftable member 35 against movement, and which locking means comprises an interlock comprehending a pair of locking members, one shown as a sector-shaped rocking stop 80, carried by the bucket by means of the hub of the rocking stop 58 and provided with a stop or working face 81, and the other, as 82, carried by the hub of the weighted shiftable member 35, whereby when the closer opens the stop 80 is movable simultaneously with the stop 58 to bring its locking-face 81 into engagement with the side of the stop 82, and thus prevent the upward movement of the clutch-regulator 35 and its actuator 38 in a manner that will be clearly understood without a more prolix description.

As the primary object of this invention is to obtain a true and correct load by the reduction or decrease of the material within the load-receptacle and before the final discharge or disposition of the major part of such material, rather than by the induction or increase of material thereto, and to obtain such decrease or reduction either by a device, instrumentality, or means which, during the load-reducing period, may be mechanically continuously operative to permit or cause such reduction, or by an instrumentality or means operative to convey, feed, or discharge or positively cause to decrease such load as contradistinguished from means simply operative to permit the decrease of the load, as by the outflow of the material due to gravity, means or mechanism operative to accomplish this result and herein termed, for the purposes of this specification, a "load-reducing" instrumentality, means or mechanism is provided, and in one form thereof it is shown commencing its reducing operation during the descent of the bucket, due to the supply of a sufficient amount of material to effect such descent, and after the valve cuts off the supply thereto, such reduction continuing until the load in the bucket is sufficiently decreased to permit said bucket to return to its poising position, and since this reducing means is shown carried in the present structure on the load-receiver it may be considered, if desired, as forming a part of the weighing or poising mechanism.

The load-reducing instrumentality, mechanism, or means, designated generally by C and herein illustrated in its preferred form for accomplishing in one way the reduction or decrease of the load before the final discharge of the major part of the material from the load-receptacle, comprises an instrumentality, means, or mechanism operative to positively discharge, feed, or convey the material from said receptacle, and hereinafter designated, for the purposes of brevity, as a "feeder," "discharger," or "conveyer," and driving means for operating the same at a predetermined period in the operation of the weighing mechanism to cause the same to perform its proper work accurately and quickly.

The bucket is shown provided with an opening 85 at one side thereof, communicating with a conduit or spout 86, the free end of which is adjacent to and above a material surplus or excess conduit hereinafter described. Adjacent to this opening and extending from the wall thereof into the bucket is shown a casing or hood 87, open at its inner end and under side into said bucket. Within this casing a load-reducing instrumentality—such as a conveyer, feeder, or discharger—is disposed for operation, and it is shown herein comprising a rotary instrumentality, preferably having a plurality or series of working members or blades, shown in this instance connected and forming one continuous blade and illustrated as a helicoidal or spiral conveyer in the nature of a screw or propeller 88, the shaft 89 of which is journaled in a bearing 90, formed by a bracket 91, mounted on the outer wall of the bucket, and which shaft 89 is connected by some suitable coupling means with driving mechanism, (herein shown embodying suitable clutch mechanism.) In the form shown this coupling comprises a coupling member 92, shown connected to said shaft 89 by a universal joint 93, of any suitable and desired construction, adapted for the purpose and its opposite end connected by a similar universal joint 93' with a driving-shaft 94, journaled for intermittent rotation in a bearing or hub 95, which in turn is shown adjustably journaled in one of the side frames, as 3, of the framework for continuous rotation. Mounted on or formed as a part of this adjustable bearing are a driving-pulley 96 and a clutch member 97, constituting a driving clutch member. This pulley is connected with any suitable source of power for continuous rotation; but it is herein shown connected by means of the belt 43, Fig. 2, with the pulley 17, said belt 43 being shown herein operating both the valve and reducing mechanism, a guide-pulley 99 being mounted on one of the members of the side frame 3 for guiding such belt into operative position with the series of pulleys.

Mounted on the driving-shaft 94 for longitudinal adjustment thereon and shown herein splined thereto is a clutch member 100, constituting the driven clutch member of the reducing-clutch mechanism, and which member is provided with an exterior groove or way 101 for the reception of a bifurcated end 102 of a clutch-actuator 103, (shown as an angle or two-way lever,) pivotally secured for swinging or oscillatory movement to a bracket 104, projecting from the side frame 3, one arm, as 105, of which lever is shown extending substantially at right angles to its other arm, 105', and connected to an actuator or actuating member 106, operative by the weighing mechanism and shown in the present instance carried by the bucket and shown herein as a rod, one end of which is fixedly secured to one of the bucket-brackets 107. This actuator 106 slides in an opening or aperture in the end of the clutch-actuator arm 105 and is provided with a pair of adjustable devices, such as sleeves or nuts 108 and 108'. On the engagement of the lower sleeve 108' with the arm 105 at a predetermined point in the ascent of the bucket the driven clutch member will be moved outward, as shown in Fig. 9, and on engagement of the upper sleeve 108 with said arm 105 on the descent of said bucket said driven clutch member will be moved into engagement with the driving clutch member, whereby the screw will be rotated, such rotation continuing as long as such clutch members are in engagement, from which it will be seen that the operation of the load-reducing means is controlled by the weighing mechanism, (in this instance through the instrumentality of the load receiver or receptacle,) and that by adjusting the sleeves or nuts 108 and 108' the period when the load-reducing means is thrown into and out of operation is regulated, so that by this adjustable means the load-reducing means may be thrown into and out of operation at any desired period in the operation of the machine.

In order positively to maintain the clutch members in engagement with each other at the proper time and to also maintain the same disengaged at a certain period in the operation of the apparatus, suitable means for this purpose is provided and herein shown comprising a pair of cams 110 and 112, one, as 110, carried by the clutch-actuator 103 and the other, as 112, carried by a sliding member, such as a rod 113, longitudinally adjustable in a recess 114 of the bracket 104 and side frame 3, and which cams are provided with angle-faces and are constantly held in engagement with each other by a coiled spring mounted in a socket 115, surrounding the recess 114 and a part of said rod 113, whereby when the apex of the cam 112 is in engagement with the face 110' above the apex of the cam 110 the clutch members will be held disengaged, Fig. 9; but when the apex of said cam 112 is in engagement with the face 110'' below the apex of said cam 110 the clutch members will be held in positive engagement in a manner that will be readily understood without further description.

Owing to the universal-joint connection intermediate the screw-shaft and the driving-shaft 94, carrying the adjustable clutch member, the bucket can ascend and descend without operating this clutch member from its inoperative position, such operation thereof taking place by means of the actuating-rod 106 alone, the adjustable sleeves 108 and 108' of which determine the precise period at which the reducing mechanism is thrown into and out of operation.

To carry off the surplus or excess material conveyed from the bucket during the reducing operation, a conduit system (designated generally by F) is shown having its receiving end 120 disposed below the bucket-spout 86 to thereby receive the material from such spout, this conduit being shown inclined downwardly, its lower end communicating with an upright or perpendicular conduit 121, connected with a second inclined conduit 122, leading therefrom to the supply-hopper 6. Within this perpendicular conduit 121, suitable elevator mechanism is disposed, such as a belt 123, carrying a series of buckets 124 in position to lift the surplus material as it reaches the lower end of the conduit 121 and empty the same into the inclined conduit 122, from whence it flows into the supply-hopper 6 and chute 6' to be again supplied to the bucket. This conduit system and elevator mechanism may be similar, if desired, to that shown and described in my prior patent, No. 572,067, dated November 24, 1896, or may be of any other construction adapted for the purpose.

The operation of this improved weighing apparatus when constructed substantially as herein shown and described is as follows: The closer being shut and locked, the load-reducing mechanism at rest, the bucket in its normal raised position, and the reciprocatory valve open, the flow of material to said bucket is uninterrupted and continuous until such bucket is supplied with an overload—that is to say, has received more material than is necessary to constitute its true and proper load—and when the supply is sufficient it descends, raising the counterbalancing-weights of the beam mechanism from their supports, Fig. 3, and likewise the counterweighted lever 40, thus permitting the actuator 38 to descend and shift the clutch-regulator 35, which takes place during the first part of the descent of the bucket, whereupon the arm 30 is shifted away from the clutch-arm 24 of the clutch member 22, which thereupon immediately swings into position to engage the driving clutch member 20, whereby the valve is quickly closed and the supply of material cut off, at which time the clutch-arm 24 has made a half-rotation and is in position to engage the cam-face of the other shiftable arm 31, whereby the clutch members are disconnected and further action or opening of the valve prevented, the stoppage of the valve-cranks being shown in this construction preferably adjacent to the dead-centers thereof in each instance. Simultaneously with the closing of the valve the rotary stop 55 is rotated into position to unlock the rocking stop 58, thus unlocking the closer, whereby it remains locked shut by its supplemental locking means alone. As the bucket descends below its poising-point in accordance with one timing of the reducing means the actuator 106, which is movable therewith, operates the reducing-clutch actuator 103, and thus throws the reducing-clutch mechanism into gear, whereby the load-reducing mechanism commences its operation, the screw thereof rotating and forcing a continuous stream of material from the inside of the bucket into the spout 86, from which it is emptied into the conduit system, and from thence again into the supply-hopper and chute for a succeeding load. The load-reducing mechanism continues in operation until the overload has been sufficiently reduced to permit the bucket to ascend to its poising position, such ascent of the bucket stopping the operation of the reducing mechanism at the proper time and when the true load has been obtained. During the ascent of the bucket and when it has reached its poising position the locker 71 is tripped by the trip-arm 75, thus releasing the shiftable member 70 and thereby unlocking the closer, which by the weight of the load in the bucket is immediately forced open, the valve locked closed, and the load rapidly discharged. That portion of the material under the hood and still in engagement with the blades of the propeller or screw when the same was thrown out of action (owing to the construction of such blades and the consequent angle of repose of the material) will slide into the bucket and be likewise discharged, the area of the propeller-blades being such that the spout is always maintained closed against any outflow of material at this point, except through the medium of the propeller when in action. Furthermore, this hood or casing 87 forms a protection to the conveyer during the load-receiving period and prevents the weight of the material above from bearing upon such conveyer, and thereby affords it greater freedom of rotation during its load-reducing period. It also so protects the conveyer from the surrounding material that a stream of diminishing capacity may be delivered from the commencement of operation of the conveyer until its cessation, when the receiver reaches its poise position, since, owing to the protection which the hood affords the conveyer, the material during the operation of the conveyer is not permitted to flow into the vacant space left by the withdrawal of such material as fast as it is withdrawn. When the closer is open, the locking-stops 80 and 82 for the clutch-regulator 35 and its actuator 38 prevent any movement of the same on the ascent of the bucket, which immediately ascends to its normal position from its poising position or position of final discharge after a certain quantity of material has been discharged therefrom, the beam mechanism thus returning to its normal position, the counterweighted lever 40, however, being prevented from descending owing to the locking of the actuator 38. After all of the material has been discharged from the bucket the closer immediately shuts by means of its counterbalancing-weights, thus unlocking the valve which was locked closed on the opening of such closer and also unlocking the shiftable clutch-regulator 35 and its actuator 38, which is immediately raised by the descent of the counterweighted lever 40, whereby the valve-clutch mechanism is thrown into engagement and the valve opened to permit a resupply to the bucket. The locker 71 at this time, Fig. 2, and until the bucket commences to descend is not engaged by the trip-arm 75; but as the bucket commences to descend with its load the catch of the locker is carried below the end of said trip-arm 75, and the same by means of its weight is shifted into position to engage such locker in readiness to shift the same and unlock the closer at the proper predetermined period.

From the foregoing it will be seen that the true load is obtained by reducing an overload instead of increasing an underload, as has been the general practice heretofore, and that such reduction in one construction of reducing mechanism is a positive reduction and not dependent upon the gravity or inherent action of the material, as in my Patent No. 572,067 above referred to, so that such reduction can take place more rapidly and with better results than is the case where the material is simply permitted to flow out.

It will of course be understood that the operating mechanisms are so timed that the working thereof will take place in their proper sequence and that by changing the time of such operations the supply to the bucket could continue after the reducing mechanism has commenced to operate, if desired, such supply being reduced to a drip, if desirable, during the gradual descent of the bucket, the reducing mechanism being brought into operation at any desired point in the descent of such bucket by adjusting the sleeves or nuts 108 and 108' on the actuator 106.

In conclusion, it will be seen from the foregoing that this invention contemplates, broadly, overloading means, either mechanically continuously operative or positively-acting, load-reducing means, and preferably load-discharging means, operative in the order stated, the load-reducing means preferably being continuously operative during a part of the descending and ascending movements of the load-receptacle and the discharging means preferably being operative on the ascent of such receiver to the poising-point and immediately following the cessation of operation of the load-reducing means, and also contemplates, broadly, load-supply means, load-reducing means, and load-discharging means, the load-reducing means being operative during the supply to the receptacle previous to the operation of the load-discharging means, and therefore it will again be understood, in connection with the foregoing statement, that any means or mechanism operative to accomplish the results above set forth is considered within the scope of this invention, the same not being limited to that mechanism herein particularly shown and set forth, as such illustration is simply made and described for the purpose of showing an operative device and one form of apparatus.

As hereinbefore stated, the load-reducing means may operate simultaneously with a part of the supply, and in connection with this part of the invention Figs. 14 to 17 illustrate, according to one mode, a load-reducing means operative during a part of the load-supply to the weighing mechanism.

In my rising-poise weighing-machines since the counterbalancing-weight is usually equal only to the true or desired load it follows that in the supply of an overload the load-receiver commences to descend when the impact of the falling material, coupled with the weight of the material already supplied, is sufficient, since, as above stated, the counterbalancing-weight is only equal to the true load and not to the overload. By throwing the load-reducing means into operation simultaneously with or during a part of the supply to the weighing-machine and before such supply ceases the overload is more gradually made up, since there is an outlet for a part of the load-supply on the same principle that the resistance of a compressed body is decreased by allowing a vent therefor, so that while a portion of the load may be running in a portion thereof is also running out, so that by the gradual making-up of the overload the tendency of the receiver is to descend more gradually to its overload position, thereby materially obviating the jar and noise which necessarily follows when an overload is suddenly made up and the mechanism suddenly descends, so that wear on the mechanism is materially eliminated and the life of the machine necessarily prolonged. Furthermore, with some classes of material, especially with sluggish material, it is desirable to commence the reduction before the supply ceases, thereby to facilitate an otherwise prolonged reduction. Aside from the foregoing, however, when the load-reduction commences before the supply is entirely cut off it follows that the action of the machine is more continuous—that is to say, the sudden throwing into operation of one portion of the mechanism after another part thereof has ceased to operate is avoided, while also by this method the period of operation at each weighing of the load is reduced, so that in the aggregate a material saving in time is effected. In the present instance when the load-receiver has been supplied with a certain quantity of material sufficient to cause the load-receiver to commence to move and descend it moves toward its overload position, whereupon, owing to the adjustment of the sleeve 108 with relation to the clutch-actuator 103, (see Figs. 14 to 17,) the load-reducing means will be thrown into operation, whereby the reduction takes place simultaneously with a part of the supply and may continue throughout the remainder of such supply and until the valve completely cuts off the supply or until that part of such supply usually flowing intermediate said valve and the receiver has been completely received by said receiver, at which time there is, as hereinbefore set forth, an overload, the load-reducing means in the present instance continuing in operation until a sufficient amount of material has been reduced to permit the true load to poise, whereupon the load-reducing means is thrown out of operation and the load discharged in the usual manner, as hereinbefore set forth.

Having described my invention, I claim—

1. The combination, with weighing mechanism, of the following instrumentalities: load-supply means therefor; positively-acting load-reducing means operative to act on the load in such manner as to positively reduce or decrease the same independently of its reduction by gravity, whereby the reduction of such load is quickly effected, such reduction taking place before the desired load is obtained, and said load-reducing means being thrown out of operation by the poising of the weighing mechanism; and load-discharging means operative, on the poising of the weighing mechanism, to discharge that part of the load remaining in said weighing mechanism after the cessation of operation of said load-reducing means, whereby the poising of said weighing mechanism determines the period of operation of said load-reducing means and said load-discharging means, throwing the load-reducing means out of operation and the load-discharging means into operation.

2. The combination, with weighing mechanism having a poise position, of the following instrumentalities: means for supplying the entire load of material to said weighing mechanism; load-reducing means operative simultaneously with or during a part of such supply of material to said weighing mechanism, whereby the supply may be gradually obtained and such supply reduced to permit the weighing mechanism to move to its poise position; and means for discharging the load.

3. The combination, with material-supply means, of weighing mechanism operative to weigh a load of material, and also reduce such material simultaneously with or during a part of the supply thereof to the said weighing mechanism, whereby the supply may be gradually obtained, and load-discharging means.

4. The combination, with means for supplying an overload, of weighing mechanism effective to weigh a load; a positively-acting load-reducing instrumentality operative, during such supply to the weighing mechanism, to reduce the overload; and load-discharging means.

5. The combination with weighing mechanism operative to weigh a load, of positively-acting load-reducing means operative to reduce said load, and controlled in its operation by the weighing or poising mechanism on the operation thereof; and load-discharging means.

6. The combination with weighing mechanism operative to weigh a load; load-reducing means operative to reduce the load; means for driving said load-reducing means and controlled by the weighing or poising mechanism on the operation thereof; and load-discharging means.

7. In a weighing-machine, the combination with a load-receiver, of load-supply means therefor; load-reducing means; driving means for said load-reducing means and directly controlled by the receiver on the operation thereof; and load-discharging means.

8. In a weighing-machine, the combination with a reciprocatory load-receiver, of overload-supply means therefor; a load-reducing conveyer controlled in its operation by said receiver on the reciprocation thereof; and load-discharging means.

9. The combination, with a load-receiver having a poising position; load-supply means therefor; load-reducing means comprising a propeller carried by said receiver and operative to act on the load in such manner as to propel a part of the load from said load-receiver, independently of its outflow by gravity, whereby the reduction of the load is quickly effected, such reduction taking place before the desired load is obtained, and said propeller being thrown out of operation by the poising of the load-receiver; and load-discharging means operative on the poising of the load-receiver to discharge that part of the load remaining in said load-receiver after the cessation of operation of said propeller, whereby the poising of said receiver determines the period of operation of said propeller and said load-discharging means, throwing the propeller out of operation and the load-discharging means into operation.

10. The combination with weighing mechanism having a poise position, of the following instrumentalities: means for supplying an overload to said weighing mechanism; rotary load-reducing means operative simultaneously with or during a part of the supply of material to said weighing mechanism, thereby to reduce the load and permit the weighing mechanism to move to its poise position; and load-discharging means.

11. The combination, with a load-receiver having a poising position, of load-supply means therefor; load-reducing means carried within said receiver and operative to act on the load in such manner as to decrease or reduce the same independently of its reduction by gravity, whereby the reduction is quickly effected, such reduction taking place before the desired load is obtained; means carried without said receiver for operating said load-reducing means, said load-reducing means and its operating means being thrown out of operation by the poising of the load-receiver; and load-discharging means operative on the poising of the load-receiver to discharge that part of the load remaining in said receiver after the cessation of operation of said load-reducing means, whereby the poising of said receiver determines the period of operation of said load-reducing means and said load-discharging means, throwing the load-reducing means out of operation and the load-discharging means into operation.

12. The combination, with weighing mechanism, of load-supply means therefor; load-reducing means operative to reduce the load; power-driven means for actuating said load-reducing means; means having connection with the weighing or poising mechanism and embodying a member reciprocative in a vertical plane and operative to throw said load-reducing means into and out of operative connection with said driving means; and load-discharging means.

13. The combination with a load-receiver, of overload-supply means therefor; load-reducing means operative to reduce the load; power-driven means for driving said load-reducing means; means embodying a member connected to and movable with said receiver, and operative for throwing said reducing means into and out of operative connection with said power-driven means; and load-discharging means.

14. The combination with framework, of a load-receiver; overload-supply means therefor; load-reducing means operative to reduce the load; means for driving said load-reducing means; combined oscillatory and reciprocatory means for throwing said load-reducing means into and out of operative connection with said driving means, the oscillatory part thereof being carried by said framework, and the reciprocatory part by the load-receiver; and load-discharging means.

15. The combination with a load-receiver, of overload-supply means therefor; rotary load-reducing means for reducing the material supplied to said receiver; means for actuating the same; means embodying reciprocatory means carried by and movable with said receiver, and operative to throw said reducing means into and out of operative connection with said actuating means; and load-discharging means.

16. The combination with weighing mechanism, of overload-supply means therefor; a load-reducing instrumentality; means embodying clutch mechanism for actuating said load-reducing instrumentality; and load-discharging means.

17. The combination with a load-receiver, of load-supply means; positively-acting load-reducing means operative to reduce the load; means for actuating said load-reducing means and embodying clutch mechanism operative, on the movement of the receiver, to throw said load-reducing means into and out of operation; and load-discharging means.

18. The combination with weighing mechanism, of load-supply means therefor; rotary load-reducing means; means for actuating said rotary load-reducing means and embodying clutch mechanism; and load-discharging means.

19. The combination, with weighing mechanism operative to weigh a load, of load-reducing means comprising a discharger, feeder or conveyer operative to act on the load in such manner as to convey, feed or discharge a part of the load therefrom independently of its reduction by gravity, whereby the reduction is quickly effected, such reduction taking place before the desired load is obtained, and said load-reducing means being thrown out of operation by the poising of the weighing mechanism, the poising of said weighing mechanism thereby determining the period of operation of said load-reducing means.

20. In a machine of the class specified, the combination, with a load-receiver having a poising position, of the following instrumentalities: a load-reducing device non-displaceable relatively to said receiver and operative to act on the load in such manner as to decrease or reduce the same independently of its reduction by gravity, whereby the reduction is quickly effected, such reduction taking place before the desired load is obtained, and said load-reducing device being thrown out of operation by the poising of the load-receiver, the poising of said load-receiver thereby determining the period of operation of said load-reducing device.

21. The combination, with weighing mechanism having a load-receiving period, a poising period and a load-reducing period, of load-supply means therefor; a load-reducing device continuously operative during the load-reducing period to act on the load in such manner as to convey, feed or discharge a part of the load therefrom independently of its reduction by gravity, whereby the reduction is quickly effected, such reduction taking place before the desired load is obtained, and said load-reducing device being thrown out of operation by the poising of the weighing mechanism, the poising of said weighing mechanism thereby determining the period of operation of said load-reducing device.

22. The combination, with a load-receiver having a poising position, of overload-supply means therefor; and a load-reducing device comprehending an instrumentality having a plurality of members or blades operative to act on the load in such manner as to convey, feed or discharge a part of the load therefrom independently of its reduction by gravity, whereby the reduction is quickly effected, such reduction taking place before the desired load is obtained, and said load-reducing device being thrown out of operation by the poising of the load-receiver, the poising of said receiver thereby determining the period of operation of said load-reducing device.

23. The combination, with weighing mechanism having successive load-receiving, overload, and poising positions; and rotary load-reducing means operative during its rotary movement to act on the load in such manner as to decrease or reduce the same independently of its reduction by gravity, whereby the reduction is quickly effected, such reduction taking place before the desired load is obtained, and said rotary load-reducing means being thrown out of operation by the poising of the weighing mechanism, the poising of said weighing mechanism thereby determining the period of operation of said rotary load-reducing means.

24. The combination, with means for supplying a load, of weighing mechanism effective to weigh such load, and rotary load-reducing means operative, during a part of such load-supply to the weighing mechanism, to reduce the load; and load-discharging means.

25. The combination, with weighing mechanism, of means for supplying an overload thereto; load-reducing means operative, simultaneously with or during a part of such overload-supply to the weighing mechanism, to reduce the load supplied thereto; means for conveying the surplus of the load discharged by the reducing means into position to be again supplied to said weighing mechanism, and means for directing the material from the reducing means to the conveyer.

26. The combination, with weighing mechanism, of load-supply means therefor; a positively-acting load-reducing device comprising a screw conveyer operative to convey, feed or discharge a part of the load from the receiver preparatory to the discharge of the completed load therefrom; and load-discharging means operative to discharge the completed load.

27. The combination, with weighing mechanism operative to weigh a load, of load-supply means therefor; load-reducing means operative to act on the load in such manner as to decrease or reduce the same independently of its reduction by gravity, whereby the reduction is quickly effected, such reduction taking place before the desired load is obtained; and driving means for actuating said load-reducing means, said load-reducing means and its driving means being thrown out of operation by the poising of the weighing mechanism, the poising of said weighing mechanism thereby determining the period of operation of said load-reducing means and its driving means.

28. The combination, with weighing mechanism operative to weigh a load and to discharge the weighed load therefrom, of load-supply means therefor; load-reducing means effective to reduce the load preparatory to the discharge of the weighed load; and means embodying clutch mechanism for actuating said load-reducing means.

29. The combination, with framework, of a load-receiver; overload-supply means therefor; load-reducing means comprehending rotary means carried by said receiver and effective for reducing the load preparatory to the main discharge thereof; driving means supported by said framework for actuating said rotary means, and embodying clutch mechanism; and means directly carried by the receiver for actuating said clutch mechanism to thereby throw said driving means into and out of engagement with the rotary load-reducing means.

30. The combination, with weighing mechanism, of load-supply means therefor; positively-acting load-reducing means operative to act on the load in such manner as to positively decrease or reduce the same independently of its reduction by gravity, whereby the reduction is quickly effected, such reduction taking place before the desired load is obtained, and said load-reducing means being thrown out of operation by the poising of the weighing mechanism, the poising of said weighing mechanism thereby determining the period of operation of said load-reducing means; and means for conveying such discharged material into position to be again supplied to said weighing mechanism.

31. The combination with weighing mechanism having a poise position, of the following instrumentalities: overload-supply means; positively-acting load-reducing means operative, before the weighing mechanism reaches its poise position, to convey, feed or discharge a part of the load thereof, and controlled in its operation by the weighing or poising mechanism; means for conveying the so-discharged material into position to be again supplied to the weighing mechanism; and load-discharging means for the remaining part of such material.

32. In a rising-poise weighing-machine, the combination, with weighing mechanism embodying a load-receiver having an opening in its wall, of load-supply means; a load-reducing instrumentality operative to feed material through said opening; and a semicylindrical hood disposed in position adjacent to the opening in said wall and above said load-reducing instrumentality to protect said instrumentality from the material supplied to the receiver.

33. In a weighing-machine, the combination, with load-supply means, of weighing mechanism embodying beam mechanism; a sliding stream-valve effective to completely cut off the load-supply at one period; power-driven means for actuating said stream-valve; and automatic means for throwing said driving means into and completely out of connection with said stream-valve during each weighing operation, so that until the discharge of the load is assured the driving means cannot operate said stream-valve to permit a new supply, said automatic means including a shiftable non-rotatable member and a thrust-rod pivotally secured to said shiftable member and in position to be directly engaged by the beam mechanism.

34. The combination with weighing mechanism, of a reciprocatory stream-controller operative to regulate the supply of material to said weighing mechanism; driving means including a rotary driver for said stream-controller; and means operative to interrupt said rotary driver a plurality of times during each complete rotation thereof.

35. The combination with weighing mechanism, of a reciprocatory stream-controller operative to regulate the supply of material to said weighing mechanism; means for actuating said stream-controller and embodying a rotary driver; and means controlled by the weighing mechanism for interrupting said rotary driver a plurality of times during each complete rotation thereof.

36. The combination with framework, of a load-receiver, and its beam mechanism; a reciprocatory stream-controller operative to regulate the supply of material to said receiver; driving means for said stream-controller; and means for interrupting said driving means at the reversing-points of said stream-controller, and including a pair of interrupters carried by said framework.

37. The combination with weighing mechanism embodying beam mechanism, of a reciprocatory valve operative to regulate the supply of material to said weighing mechanism; driving means for said valve; and means controlled by the beam mechanism for throwing said driving means into and out of operative connection with said valve, and comprising a pair of interrupters connected together and operative simultaneously into position, one to permit the driving means to be thrown into operative connection with said valve, thereby to shift the same, and the other to throw said driving means out of operative connection therewith at a predetermined period.

38. In a weighing-machine, the combination, with weighing mechanism, of load-supply means; a reciprocatory stream-controller therefor; means for actuating said stream-controller and embodying a pair of clutch members; and means controlled by the weighing or poising mechanism for controlling the engagement of said clutch members, and embodying an interrupter shiftable into position intermediate said clutch members to disengage the same at the reversing-points of said stream-controller.

39. In a weighing-machine, the combination with weighing mechanism embodying beam mechanism, of load-supply means; a sliding valve therefor; means for actuating said valve, and embodying a pair of clutch members; and means controlled by the beam mechanism for controlling the engagement of said clutch members, and embodying an interrupter shiftable into position intermediate said clutch members to disengage the same at the reversing-points of said valve.

40. In a weighing-machine, the combination, with a weighing mechanism embodying beam mechanism, of a reciprocatory stream-controller; driving means for actuating said stream-controller; and means embodying a positively-acting interrupting means for controlling connection between said driving means and stream-controller, and controlled by and operative on the movement of the beam mechanism in one direction to permit said driving means to shift the stream-controller in one direction and also to throw said driving means out of connection with said stream-controller after the shifting thereof, thereby to stop the same in one position, and operative by the beam mechanism on its movement in another direction to permit said driving means to shift said stream-controller in another direction, and also to throw said driving means out of connection with said stream-controller after the shifting thereof, thereby to stop the same in another position.

41. In a weighing-machine, the combination with weighing mechanism, of a reciprocatory stream-controller; driving means for actuating said stream-controller; and weighted mechanism for controlling connection between the driving means and stream-controller, and operative at one period by its weight to permit said driving means to shift the stream-controller in one direction, and also to throw said driving means out of connection with said stream-controller after the shifting thereof, thereby to stop the same in one position, and operative at another period by the weighing mechanism to permit said driving means to again shift said stream-controller, and also to throw said driving means out of connection with said stream-controller after the shifting thereof, thereby to stop the same in another position.

42. In a weighing-machine, the combination with weighing mechanism embodying beam mechanism, of a reciprocatory stream-controller; driving means for actuating said stream-controller; and weighted mechanism for controlling connection between said driving means and stream-controller, and operative by its weight, of the movement of the beam mechanism in one direction, to permit said driving means to shift the stream-controller in one direction, and also to throw said driving means out of connection with said stream-controller, thereby to stop the same in one position, and operative by the beam mechanism, on its movement in another direction, to permit said driving means to again shift said stream-controller in another direction, and also to throw said driving means out of connection therewith, thereby to stop the stream-controller in another position.

43. In a weighing-machine, the combination with weighing mechanism, of a reciprocatory stream-controller; driving means for actuating said stream-controller; and means embodying clutch mechanism for controlling connection between said driving means and stream-controller, and operative at one period to permit said driving means to shift the stream-controller in one direction, and also to throw said driving means out of connection with the stream-controller after the shifting thereof, thereby to stop the same in one position, and operative by the weighing mechanism at another period to permit said driving means to again shift said stream-controller in another direction, and also to throw said driving means out of connection therewith after the shifting thereof, thereby to stop the stream-controller in another position.

44. In a weighing-machine, the combination with weighing mechanism embodying beam mechanism, of a reciprocatory stream-controller; driving means for actuating said stream-controller; and weighted means embodying clutch mechanism for controlling connection between said driving means and stream-controller, and operative by its weight, on the movement of the beam mechanism in one direction, to permit said driving means to shift said stream-controller in one direction, and also to throw said driving means out of connection with said stream-controller after the shifting thereof, thereby to stop the same in one position, and operative by the beam mechanism, on its movement in another direction, to permit said driving means to again shift said stream-controller in another direction, and also to throw said driving means out of connection therewith after the shifting thereof, thereby to stop the stream-controller in another position.

45. In a weighing-machine, the combination, with weighing mechanism, of a stream-controller therefor; driving means for said stream-controller; and means embodying positively-acting interrupting means for controlling connection between said driving means and stream-controller, and controlled by and operative on the movement of the weighing mechanism in one direction both to permit said driving means to shift the stream-controller in one direction, and also to throw said driving means out of connection with said stream-controller after the shifting thereof, thereby to stop the same in one position, and operative by said weighing mechanism on its movement in another direction both to permit said driving means to shift said stream-controller in another direction, and also to throw said driving means out of connection with said stream-controller after the shifting thereof, thereby to stop the same in another position.

46. In a weighing machine, the combination with weighing mechanism, of a stream-controller therefor; driving means for said stream-controller; and weighted mechanism for controlling connection between said driving means and stream-controller, and operative at one period by its weight both to permit said driving means to shift the stream-controller in one direction, and also to throw said driving means out of connection with said stream-controller after the shifting thereof, thereby to stop the same in one position, and operative at another period by the weighing mechanism both to permit said driving means to shift the stream-controller in another direction, and also to throw said driving means out of connection with said stream-controller after the shifting thereof, thereby to stop the same in another position.

47. In a weighing-machine, the combination, with weighing mechanism, of load-supply means embodying a supply-chute; a reciprocatory or sliding stream-controller operative to open and close said chute; power-driven means for shifting said stream-controller in opposite directions; and means, free of connection with said power-driven means, for locking said stream-controller in its closed position after the shifting thereof by said power-driven means, thereby to prevent the operation of said stream-controller by said driving means until after the complete discharge of the load is assured.

48. The combination with weighing mechanism, of a reciprocatory valve operative to regulate the supply of material to said weighing mechanism; means for actuating said valve; and means controlled by the weighing mechanism for throwing said actuating means out of connection with said valve at the reversing-points thereof, thereby to stop the valve; and means for locking said valve closed.

49. The combination, with weighing mechanism including beam mechanism, of a reciprocatory valve operative to regulate the supply of material to said weighing mechanism; means for actuating said valve; means controlled by the beam mechanism for throwing said actuating means into and out of operative connection with said valve; and means free of connection with said valve-actuating means for locking said valve closed, thereby to prevent the operation thereof until the discharge of the load is assured.

50. In a weighing-machine, the combination with weighing mechanism embodying beam mechanism, of a reciprocatory stream-controller; driving means for actuating said stream-controller; means for controlling connection between said driving means and stream-controller, and controlled by and operative on the movement of the beam mechanism in one direction to permit said driving means to shift the stream-controller in one direction, and also to throw said driving means out of connection with said stream-controller after the shifting thereof, thereby to stop the same in one position, and operative by the beam mechanism, on its movement in another direction, to permit said driving means to shift said stream-controller in another direction and also to throw said driving means out of connection with said stream-controller after the shifting thereof, thereby to stop the same in another position; and means for locking the stream-controller in one position and against premature movement after the stoppage thereof.

51. In a weighing-machine, the combination with weighing mechanism, of a reciprocatory stream-controller; driving means for actuating said stream-controller; weighted mechanism for controlling connection between the driving means and the stream-controller, and operative at one period by its weight to permit said driving means to shift the stream-controller in one direction, and also to throw said driving means out of connection with said stream-controller after the shifting thereof, thereby to stop the same in one position, and operative at another period by the weighing mechanism to permit said driving means to again shift said stream-controller, and also to throw said driving means out of connection with said stream-controller after the shifting thereof, thereby to stop the same in another position; and means for locking the stream-controller in one position, and against movement after the stoppage thereof.

52. The combination, with weighing mechanism including a load-receiver, of a sliding or reciprocatory supply-regulating valve; power-driven means for actuating said valve; and locking means, free of connection with said driving means and embodying a rotary locker, for locking said valve closed.

53. The combination, with a load-receptacle having a shiftable closer, of a sliding supply-regulating valve; and valve-closer locking means embodying a rotary locker operable to lock the valve closed when the closer is open and to lock the closer shut when the valve is open.

54. In a weighing-machine, the combination, with load-supply means, of a load-receptacle having a shiftable closer for discharging the load; a sliding valve; power-driven means for actuating said valve; valve-closer locking means operable to lock the valve closed when the closer is open and to lock the closer shut when the valve is open.

55. In a weighing-machine, the combination, with a load-receptacle having a shiftable closer for discharging the load, of a sliding supply-regulator valve; and valve-closer locking means embodying a rotary locker and an oscillatory locker operable to lock the valve closed when the closer is open and to lock the closer shut when the valve is open.

56. In a weighing-machine, the combination, with load-supply means, of a load-receptacle having a shiftable closer for discharging the load; a sliding valve; power-driven rotary means for actuating said valve; and valve-closer locking means embodying a rotary locker having a plurality of working faces and an oscillatory locker also having a plurality of coacting working faces and operable to lock the valve closed when the closer is open and to lock the closer shut when the valve is open.

57. In a weighing-machine, the combination, with a load-receptacle having a shiftable closer for discharging the load, of a sliding supply-regulating valve; power-driven means for actuating said valve; valve-closer locking means operable to lock the valve closed when the closer is open and to lock the closer shut when the valve is open; and supplemental locking means for said closer.

58. In a weighing-machine, the combination, with load-supply means, of a load-receptacle having a shiftable closer for discharging the load; a sliding valve for regulating the supply to said receptacle; means for actuating said valve; valve-closer locking means operable to lock the valve closed when the closer is open and to lock the closer shut when the valve is open; and supplemental locking means for said closer in position and adapted on the ascent of the receptacle to unlock said closer.

59. In a weighing-machine, the combination, with load-supply means, of a load-receptacle having a shiftable closer for discharging the load; a sliding valve for regulating the supply to said receptacle; power-driven means for actuating said valve; valve-closer locking means operable to lock the valve closed when the closer is open and to lock the closer shut when the valve is open and embodying a rotary locker; and supplemental locking means for said closer and operable on the ascent of the receptacle to its poising position to unlock such closer.

60. In a weighing-machine, the combination, with load-supply means, of a load-receptacle having a shiftable closer for discharging the load; a sliding valve for regulating the supply to said receptacle; power-driven means for actuating said valve; and means for locking the closer shut and operable on the ascent of the receptacle to its poising position to unlock said closer and thereby permit the discharge of the load.

61. In a weighing-machine, the combination, with framework, of a load-receptacle having a closer shiftable to discharge the load; a shiftable member carried by said receptacle and operatively connected with the closer; a locker also carried by said receptacle for locking said shiftable member; and a locker actuator or tripper carried by the framework and operative on the ascent of the receptacle to its poising position to unlock said shiftable member and thereby the closer and permit the discharge of the load.

62. The combination, with weighing mechanism having a load-receptacle provided with a shiftable member or closer for discharging the load, of means for locking the closer shut and operative to unlock said closer at a predetermined period in the operation of the mechanism and embodying a tripper or trip-arm; and a device operative to limit the movement of said tripper in one direction and to actuate said tripper and lock the same in its non-working position and thereby prevent the opening of the closer at its usual predetermined period.

63. The combination, with framework, of a load-receptacle having a closer shiftable to discharge the load; a shiftable member carried by said receptacle and operatively connected with the closer; a locker also carried by said receptacle for locking the shiftable member; a locker actuator or tripper carried by said framework and operative on the ascent of the receptacle to its poising position to unlock said shiftable member and thereby the closer and permit the discharge of the load; and a device operative to limit the movement of said tripper in one direction and to actuate the same to lock it in its non-working position and thereby permit the ascent of said receptacle to its poising position without the consequent opening of said closer.

64. In a weighing-machine, the combination with weighing mechanism embodying beam mechanism, of a reciprocatory stream-controller; driving means for actuating said stream-controller; weighted mechanism for controlling connection between said driving means and stream-controller, and operative by its weight, on the movement of the beam mechanism in one direction, to permit said driving means to shift the stream-controller in one direction, and also to throw said driving means out of connection with said stream-controller, thereby to stop the same in one position, and operative by the beam mechanism, on its movement in another direction, to permit said driving means to again shift said stream-controller in another direction, and also to throw said driving means out of connection therewith, thereby to stop the stream-controller in another position; and means for locking the stream-controller against movement after its stoppage in its closed position.

65. In a weighing-machine, the combination with weighing mechanism embodying beam mechanism, of a reciprocatory stream-controller; driving means for actuating said stream-controller; weighted means embodying clutch mechanism for controlling connection between said driving means and stream-controller, and operative by its weight, on the movement of the beam mechanism in one direction to permit said driving means to shift said stream-controller in one direction, and also to throw said driving means out of connection with said stream-controller after the shifting thereof, thereby to stop the same in one position, and operative by the beam mechanism, on its movement in another direction, to permit said driving means to again shift said stream-controller in another direction, and also to throw said driving means out of connection therewith after the shifting thereof, thereby to stop the stream-controller in another position; and means for locking the stream-controller against movement after its stoppage in its closed position.

66. In a weighing-machine, the combination with weighing mechanism having closer mechanism, of a stream-controller; driving means for actuating said stream-controller; weighted mechanism for controlling connection between the driving means and stream-controller, and operative at one period by its weight to permit said driving means to shift the stream-controller in one direction, and also to throw said driving means out of connection with said stream-controller after the shifting thereof, thereby to stop the stream-controller in one position, and operative at another period by the weighing mechanism to permit said driving means to again shift said stream-controller, and also to throw said driving means out of connection with said stream-controller after the shifting thereof, thereby to stop the stream-controller in another position; and locking means for said closer mechanism and stream-controller, and operative to lock the closer shut when the stream-controller is open, and to lock the stream-controller closed when the closer is open.

67. In a weighing-machine, the combination with weighing mechanism embodying beam mechanism and provided with closer mechanism, of a reciprocatory stream-controller; driving means for actuating said stream-controller; weighted means embodying clutch mechanism for controlling connection between said driving means and stream-controller, and operative by its weight, on the movement of the beam mechanism in one direction, to permit said driving means to shift said stream-controller in one direction, and also to throw said driving means out of connection with said stream-controller after the shifting thereof, thereby to stop the same in one position, and operative by the beam mechanism, on its movement in another direction, to permit said driving means to again shift said stream-controller in another direction, and also to throw said driving means out of connection therewith after the shifting thereof, thereby to stop the stream-controller in another position; and means for locking the closer mechanism shut when the stream-controller is open, and for locking the stream-controller closed when the closer is open.

68. The combination, with a load-receptacle having supplemental and main discharge means, of load-supply means for said receptacle; a reciprocatory valve operable to regulate the supply to said receptacle; power-driven mechanically-operative means adjacent to said supplemental discharge means and non-displaceable relatively thereto for discharging, through said supplemental discharge means, a portion of said load during the weighing operation; and mechanically-operative means operable adjacent to said main discharge means to effect the discharge of a complete load.

69. The combination with a load-receiver having a poise position, of load-supply means therefor; a sliding stream-controller for regulating the supply of material to said receiver; and positively-acting load-reducing means operative, before the receiver reaches its poise position, to reduce the load in the receiver preparatory to its final discharge.

70. The combination with a load-receiver having a poise position, of overload-supply means therefor, a sliding stream-controller for regulating the supply of material to said receiver; power-driven load-reducing means operative, before the receiver reaches its poise position, to reduce the load within said receiver; and load-discharging means operative after the cessation of said load-reducing means.

71. In a weighing-machine, the combination with load-supply means, of a load-receiver; a sliding valve operative to regulate the supply thereto; power-driven means for actuating said valve; and power-driven load-reducing means operative to discharge a part of the load.

72. The combination with a load-receiver having a poise position, of load-supply means therefor; a sliding stream-controller for regulating the supply to said receiver; and rotary load-reducing means operative, before the receiver reaches its poise position, to reduce or decrease the load within said receiver preparatory to its final discharge.

73. In a weighing-machine, the combination with load-supply means, of weighing mechanism operative to weigh a load; a stream-controller for regulating the supply of material to said weighing mechanism; power-driven means for actuating said stream-controller; load-reducing means operative to reduce the load preparatory to its final discharge; power-driven means for actuating said load-reducing means; and load-discharging means.

74. In a weighing-machine, the combination with load-supply means, of a reciprocatory load-receiver; a reciprocatory stream-controller for regulating the supply of material to said receiver; power-driven means for actuating said stream-controller; rotary load-reducing means operative to decrease or reduce, during the weighing operation, a part of such load; and oscillatory load-discharging means.

75. The combination with weighing mechanism operative to weigh a load, of load-supply means therefor; a reciprocatory stream-controller operative to regulate the supply of material to said weighing mechanism; power-driven means for actuating said stream-controller; positively-acting load-reducing means operative to reduce or decrease the load of said weighing mechanism preparatory to the final discharge thereof, and in operative connection with the driving means for the stream-controller, power-driven means, whereby said load-reducing means and stream-controlling means may be actuated by the same power; and load-discharging means.

76. In a weighing-machine, the combination with weighing mechanism, of load-supply means for said weighing mechanism, of a reciprocatory stream-controller operative to regulate the supply of material thereto; driving means for said stream-controller; means for interrupting said driving means at the reversing-points of said stream-controller; and means operative to lock said interrupting means against movement at a predetermined period in the operation of the machine.

77. In a machine of the class specified, the combination, with framework, of a sliding valve supported thereby; a load-receptacle; beam mechanism; driving mechanism for actuating said valve and embodying clutch mechanism comprising a driving and a driven member; a weighted regulator member carried by said framework and in operative engagement with the beam mechanism; and a pair of shiftable arms operatively connected with said weighted member and operative to disengage the clutch members at predetermined periods in the movement of the valve, to thereby stop said valve.

78. In a machine of the class specified, the combination, with framework, of a sliding valve supported thereby; a load-receptacle; beam mechanism; driving means for actuating said valve and embodying clutch mechanism comprising a driving and a driven member, said driving member having a shiftable arm for engaging said driven member; a weighted regulator member carried by said framework; an actuator carried by said regulator member and in operative engagement with the beam mechanism; and a pair of shiftable arms operatively connected with the regulator member and each provided with a cam-face and a stop coacting with the clutch-member shiftable arm, to thereby disengage the clutch members at predetermined periods in the movement of the valve and thereby stop the same.

79. In a weighing-machine, the combination with a load-receiver operative to weigh a load; positively-acting load-reducing means; driving means therefor; means for throwing said driving means into and out of operative connection with said load-reducing means, and including means carried by said receiver for controlling said connecting means and determining the period of operation of said load-reducing means, and comprising a shiftable member and an adjustable device carried thereby.

80. In a weighing-machine, the combination, with load-supply means, of a sliding valve; beam mechanism; a load-receptacle having a shiftable closer; driving means for said valve; means for interrupting said driving means at the reversing-points of said valve; and means for locking said interrupting means against movement at a predetermined period in the operation of the machine and comprising a shiftable stop carried by the receptacle and operatively connected with said closer and a coacting stop carried by the interrupting means.

81. In a weighing-machine, the combination, with a load-receptacle, of load-reducing means operative during the weighing of a load to reduce the same; driving means therefor and embodying clutch mechanism; a clutch-actuator operable to control the operation of said clutch mechanism; and mechanism actuated by said receptacle for operating said clutch-actuator.

82. In a weighing-machine, the combination, with a load-receptacle, of rotary load-reducing means operative during the weighing of a load to reduce the same; driving means for actuating the same and embodying clutch mechanism; a clutch-actuator operative to control the operation of said clutch mechanism; and means carried by said receptacle and in operative connection with said clutch-actuator to operate the same on the ascent and descent of said receptacle.

83. In a weighing-machine, the combination, with a load-receptacle, of load-reducing means operative during the weighing of a load to reduce the same and comprehending a screw conveyer carried by said receptacle; driving means therefor and embodying clutch mechanism; a clutch-actuator operable to regulate the operation thereof and embodying cam mechanism operative to maintain said clutch-actuator in its operative and inoperative positions; and receptacle-operated means for actuating said clutch-actuator.

84. In a weighing-machine, the combination, with a load-receptacle, of load-reducing means operative during the weighing of a load to reduce the same; driving means therefor and embodying clutch mechanism; a clutch-actuator operable to control the operation of said clutch mechanism; receptacle-actuated means for operating said clutch-actuator; and adjustable means for determining the period of operation of said clutch-actuator-operating means.

85. In a weighing-machine, the combination, with a shiftable load-receiver, of load-reducing means operative during the weighing of a load to reduce the same; driving means therefor embodying clutch mechanism, one member thereof secured to a shaft for rotation therewith; means embodying universal connections connecting said shaft and load-reducing means and operative to permit the movement of the receiver without operating said clutch mechanism; a clutch-actuator for controlling the movement of said clutch mechanism; and means carried by the load-receiver for operating said clutch-actuator.

86. In a weighing-machine, the combination, with a reciprocatory load-receptacle, of load-reducing means operable during the weighing of a load to reduce the same and comprising a screw conveyer carried by said receptacle; driving means therefor and embodying clutch mechanism, one member thereof being adjustably secured to a shaft for rotation therewith; means embodying universal connections connecting said shaft and screw conveyer and operable to permit the descent and ascent of the receptacle without operating said clutch mechanism; a clutch-actuator for controlling the movement of said clutch mechanism; cam mechanism operative to maintain said clutch mechanism in its operative and inoperative positions; and adjustable means carried by and movable with the receptacle, for operating said clutch-actuator.

87. In a weighing-machine, the combination of a reciprocatory load-receptacle; load-supply means therefor; a reciprocatory valve; driving means therefor; rotary means for partially reducing during the weighing operation the load supplied to said receptacle; oscillatory load-discharging means; and locking means for the oscillatory load-discharging means and valve and embodying coacting oscillatory and rotary means.

88. In a weighing-machine, the combination of a reciprocatory load-receptacle; load-supply means therefor; a reciprocatory or sliding valve for regulating the supply to such receptacle; rotary driving means therefor; rotary load-reducing means operative during the weighing of the load to partially reduce the material supplied to said receptacle; driving means therefor; means embodying reciprocatory means operative with the receptacle, for throwing said load-reducing driving means into and out of operation; oscillatory load-discharging means; and locking means for said load-discharging means and valve and comprehending coacting oscillatory and rotary means.

89. In a weighing-machine, the combination of a reciprocatory load-receptacle; load-supply means therefor; a reciprocatory valve for regulating the supply to such receptacle; rotary means for actuating the same; oscillatory means for controlling said rotary actuating means; rotary load-reducing means operative during the weighing of a load to partially reduce the material supplied to said receptacle; driving means therefor; means embodying adjustable reciprocatory means operative with said receptacle for controlling the operation of said driving means; oscillatory load-discharging means; locking means for said load-discharging means and reciprocatory valve and comprehending coacting oscillatory and rotary means; and means for reconveying the surplus material to be again supplied to the receptacle.

90. In a weighing-machine, the combination of a load-receiver; beam mechanism therefor; load-supply means; a sliding valve operative to regulate such supply; driving means for said valve; and means embodying positively-acting interrupting means comprising a pair of swinging members for regulating the operation of said driving means, and thereby the valve, and directly operated at one period by said beam mechanism.

91. The combination of weighing mechanism operative to weigh a load of material; load-reducing means; actuating means therefor; and adjustable means adapted to determine the period of operation of said load-reducing means.

92. The combination with weighing mechanism operative to weigh a load, of a positively-acting load-reducing device; driving means therefor; and adjustable means adapted to determine the period of operation of said load-reducing device.

93. The combination with weighing mechanism operative to weigh a load, of rotary load-reducing means; driving means therefor; and adjustable means adapted to determine the period of operation of said load-reducing means.

94. The combination with weighing mechanism operative to weigh a load, of load-reducing means; actuating means therefor; and adjustable means carried by the weighing mechanism, and adapted to determine the period at which said load-reducing means is thrown into and out of operation.

95. The combination with weighing mechanism including a load-receiver operative to weigh a load, of load-reducing means; actuating means therefor; adjustable means carried by said load-receiver, and adapted to determine the period of operation of said load-reducing means.

96. The combination with weighing mechanism including a load-receiver operative to weigh a load, of load-reducing means; driving means therefor; adjustable means carried by said receiver and adapted to determine the period of operation of said load-reducing means; and load-discharging means.

97. The combination with weighing mechanism operative to weigh a load of material; load-reducing means operative to reduce the load; driving means therefor, and embodying means for throwing said driving means out of connection with said load-reducing means; and adjustable means in position and operatively controlled by the weighing mechanism to control the period of operation of said load-reducing means.

98. The combination with weighing mechanism operative to weigh a load of material; load-reducing means operative to reduce the load; driving means therefor, and embodying clutch mechanism; and adjustable means in position and controlled by the weighing mechanism for controlling the operation of the clutch mechanism, and thereby the period of operation of said load-reducing means.

FRANCIS H. RICHARDS.

Witnesses:
FRED. J. DOLE,
GEO. A. HOFFMAN.